US009577736B2

(12) United States Patent
Patel et al.

(10) Patent No.: US 9,577,736 B2
(45) Date of Patent: Feb. 21, 2017

(54) DUAL QR DECOMPOSITION DECODER FOR SPATIALLY MULTIPLEXED MIMO SIGNALS

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 157 days.

(21) Appl. No.: 14/537,411

(22) Filed: Nov. 10, 2014

(65) Prior Publication Data

US 2016/0134344 A1 May 12, 2016

(51) Int. Cl.
*H04W 4/00* (2009.01)
*H04B 7/06* (2006.01)
*H04B 7/04* (2006.01)

(52) U.S. Cl.
CPC .......... *H04B 7/0697* (2013.01); *H04B 7/0413* (2013.01)

(58) Field of Classification Search
USPC ......... 370/203–232, 310–328; 375/260–267, 375/340–351
See application file for complete search history.

(56) References Cited

U.S. PATENT DOCUMENTS

| 7,920,647 B2* | 4/2011 | Murakami | H04L 1/0054 375/298 |
| 8,018,828 B2* | 9/2011 | Song | H04L 25/03203 370/203 |
| 8,675,783 B1* | 3/2014 | Matache | H03M 13/45 375/259 |
| 8,798,209 B2* | 8/2014 | Lee | H04B 7/08 375/260 |
| 2009/0316803 A1* | 12/2009 | Paker | H04L 25/0208 375/260 |
| 2010/0232549 A1* | 9/2010 | Oizumi | H04L 25/0204 375/341 |

* cited by examiner

*Primary Examiner* — Man Phan
(74) *Attorney, Agent, or Firm* — Lerner, David, Littenberg, Krumholz & Mentlik, LLP

(57) ABSTRACT

Wireless communication systems employ Multiple Input Multiple Output (MIMO) transmission and reception schemes to increase performance and the data rate of the system. A new approach for an SM-MIMO decoder that operates on the received symbols in parallel is presented. The new approach performs two different QR decompositions of the estimated channel matrix and produces two triangular matrices; one is right triangular and the other is left triangular. The modified systems of equations are processed in parallel. After each M-algorithm process has processed half of the total number of stages, total search space for the globally optimal transmitted symbol vector is reduced significantly. Finally, cumulative distance metrics are computed for the symbol sequences in the reduced search space and a global minimum is determined for the estimated transmitted symbol vector. This approach offers faster processing of the SM-MIMO signals and reduced distance metric computations and search operations.

20 Claims, 18 Drawing Sheets

$$\begin{bmatrix} y_0^2 \\ y_1^2 \\ y_2^2 \\ y_3^2 \end{bmatrix} = \begin{bmatrix} r_{0,0}^2 & 0 & 0 & 0 \\ r_{1,0}^2 & r_{1,1}^2 & 0 & 0 \\ r_{2,0}^2 & r_{2,1}^2 & r_{2,2}^2 & 0 \\ r_{3,0}^2 & r_{3,1}^2 & r_{3,2}^2 & r_{3,3}^2 \end{bmatrix} \begin{bmatrix} s_0 \\ s_1 \\ s_2 \\ s_3 \end{bmatrix} + \begin{bmatrix} w_0^2 \\ w_1^2 \\ w_2^2 \\ w_3^2 \end{bmatrix}$$

$$\begin{bmatrix} y_0^1 \\ y_1^1 \\ y_2^1 \\ y_3^1 \end{bmatrix} = \begin{bmatrix} r_{0,0}^1 & r_{1,0}^1 & r_{2,0}^1 & r_{3,0}^1 \\ 0 & r_{1,1}^1 & r_{2,1}^1 & r_{3,1}^1 \\ 0 & 0 & r_{2,2}^1 & r_{3,2}^1 \\ 0 & 0 & 0 & r_{3,3}^1 \end{bmatrix} \begin{bmatrix} s_0 \\ s_1 \\ s_2 \\ s_3 \end{bmatrix} + \begin{bmatrix} w_0^1 \\ w_1^1 \\ w_2^1 \\ w_3^1 \end{bmatrix}$$

FIG. 17

| Symbol Sequence | Eight Nearest Neighbor Symbol Sequences | | | | | | | |
|---|---|---|---|---|---|---|---|---|
| 0 | 1 | 4 | 2 | 8 | 5 | 6 | 9 | 10 |
| 1 | 0 | 5 | 9 | 4 | 8 | 2 | 13 | 6 |
| 2 | 3 | 6 | 0 | 10 | 7 | 4 | 8 | 11 |
| 3 | 2 | 7 | 11 | 6 | 10 | 0 | 15 | 4 |
| 4 | 0 | 5 | 6 | 1 | 2 | 7 | 8 | 3 |
| 5 | 1 | 4 | 0 | 6 | 9 | 2 | 8 | 10 |
| 6 | 2 | 7 | 4 | 3 | 0 | 5 | 10 | 1 |
| 7 | 3 | 6 | 2 | 4 | 11 | 0 | 10 | 8 |
| 8 | 9 | 12 | 0 | 10 | 13 | 1 | 2 | 14 |
| 9 | 8 | 13 | 14 | 12 | 0 | 5 | 10 | 2 |
| 10 | 11 | 14 | 8 | 9 | 15 | 0 | 3 | 12 |
| 11 | 10 | 15 | 12 | 1 | 2 | 7 | 8 | 0 |
| 12 | 8 | 13 | 14 | 11 | 10 | 0 | 15 | 1 |
| 13 | 9 | 12 | 8 | 3 | 14 | 2 | 10 | 2 |
| 14 | 10 | 15 | 12 | 11 | 8 | 2 | 13 | 0 |
| 15 | 11 | 14 | 10 | 3 | 12 | 2 | 8 | 0 |

FIG. 18

| Symbol Sequence | Four Nearest Neighbor Symbol Sequences | | | |
|---|---|---|---|---|
| 32 | 33 | 34 | 40 | 48 |
| 33 | 32 | 41 | 49 | 37 |
| 34 | 32 | 35 | 42 | 50 |
| 35 | 34 | 43 | 51 | 42 |
| 36 | 37 | 38 | 44 | 52 |
| 37 | 36 | 45 | 53 | 33 |
| 38 | 36 | 39 | 46 | 54 |
| 39 | 38 | 47 | 55 | 46 |
| 40 | 32 | 41 | 42 | 8 |
| 41 | 33 | 40 | 43 | 45 |
| 42 | 34 | 40 | 43 | 10 |
| 43 | 35 | 41 | 42 | 34 |
| 44 | 36 | 45 | 46 | 12 |
| 45 | 37 | 44 | 47 | 41 |
| 46 | 38 | 44 | 47 | 14 |
| 47 | 39 | 45 | 46 | 38 |
| 48 | 32 | 49 | 50 | 56 |
| 49 | 33 | 48 | 51 | 53 |
| 50 | 34 | 48 | 51 | 58 |
| 51 | 35 | 49 | 50 | 54 |
| 52 | 36 | 53 | 54 | 60 |
| 53 | 37 | 52 | 55 | 49 |
| 54 | 38 | 52 | 55 | 62 |
| 55 | 39 | 53 | 54 | 38 |
| 56 | 48 | 57 | 58 | 49 |
| 57 | 49 | 56 | 59 | 48 |
| 58 | 50 | 56 | 59 | 48 |
| 59 | 51 | 57 | 58 | 35 |
| 60 | 52 | 61 | 62 | 53 |
| 61 | 53 | 60 | 63 | 52 |
| 62 | 54 | 60 | 63 | 52 |
| 63 | 55 | 61 | 62 | 39 |

| Symbol Sequence | Four Nearest Neighbor Symbol Sequences | | | |
|---|---|---|---|---|
| 0 | 1 | 2 | 8 | 16 |
| 1 | 0 | 9 | 17 | 5 |
| 2 | 0 | 3 | 10 | 18 |
| 3 | 2 | 11 | 19 | 10 |
| 4 | 5 | 6 | 12 | 20 |
| 5 | 4 | 13 | 21 | 1 |
| 6 | 4 | 7 | 14 | 22 |
| 7 | 6 | 15 | 23 | 14 |
| 8 | 0 | 9 | 10 | 40 |
| 9 | 1 | 8 | 11 | 41 |
| 10 | 2 | 8 | 11 | 42 |
| 11 | 3 | 9 | 10 | 2 |
| 12 | 4 | 13 | 14 | 44 |
| 13 | 5 | 12 | 15 | 9 |
| 14 | 6 | 12 | 15 | 45 |
| 15 | 7 | 13 | 14 | 46 |
| 16 | 0 | 17 | 18 | 6 |
| 17 | 1 | 16 | 19 | 24 |
| 18 | 2 | 16 | 19 | 21 |
| 19 | 3 | 17 | 18 | 26 |
| 20 | 4 | 21 | 22 | 2 |
| 21 | 5 | 20 | 23 | 28 |
| 22 | 6 | 20 | 23 | 17 |
| 23 | 7 | 21 | 22 | 30 |
| 24 | 16 | 25 | 26 | 6 |
| 25 | 17 | 24 | 27 | 17 |
| 26 | 18 | 24 | 27 | 18 |
| 27 | 19 | 25 | 26 | 3 |
| 28 | 20 | 29 | 30 | 21 |
| 29 | 21 | 28 | 31 | 20 |
| 30 | 22 | 28 | 31 | 20 |
| 31 | 23 | 29 | 30 | 7 |

DUAL QR DECOMPOSITION DECODER FOR SPATIALLY MULTIPLEXED MIMO SIGNALS

CROSS-REFERENCE TO RELATED APPLICATION

This application is related to U.S. patent application Ser. No. 14/537,167, filed concurrently herewith and entitled "Low Latency Spatial Multiplexing MIMO decoder" (the "Low Latency" application) and issued as U.S. Pat. No. 9,118,373, the entire disclosure of which is hereby expressly incorporated by reference herein.

BACKGROUND OF THE INVENTION

Field of the Invention

The present invention relates generally to wireless communication systems and, more particularly, to methods and receiver architectures for decoding spatially multiplexed signals used in Multiple Input Multiple Output (MIMO) wireless communication systems.

Description of Related Art

Typically, as shown in FIG. 1, a wireless communication system comprises elements such as client terminals or mobile stations and base stations. Other network devices may also be employed, such as a mobile switching center (not shown). As illustrated, the communication path from the base station (BS) to the client terminal or mobile station (MS) is referred to herein as a downlink (DL) direction, and the communication path from the client terminal to the base station is referred to herein as an uplink (UL) direction. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging.

As shown in FIG. 2, client terminal/MS 12 typically contains a baseband subsystem 16 and a radio frequency (RF) subsystem 18. Memory 20, such as an external memory, is shown connected to the baseband subsystem 16. The baseband subsystem 16 normally includes a micro controller unit (MCU) 22, a signal processing unit (SPU) 24, data converters 26, peripherals 28, power management 30, and memory 32 as shown in FIG. 3. The SPU 24 may be a digital signal processor (DSP), hardware (HW) accelerators, co-processors or a combination of the above. Normally the overall control of the baseband subsystem 16 is performed by software running on the MCU 22 and the processing of signals is done by the SPU 24.

Analog to digital converters (ADCs) convert a received analog signals into digital for the baseband system to process them. Similarly, digital to analog converters (DACs) convert the processed baseband digital signals into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally includes a receiver section and a transmitter section. An RF subsystem 18 for a time division duplex (TDD) communication system is shown in FIG. 4. The receiver section normally may include one or more receivers. The receiver 34 performs the task of converting the signal from RF to baseband. Each receiver may include mixers 36, filters 38, low noise amplifiers (LNAs) 40 and variable gain amplifiers (VGAs) 42. The transmitter section may include one or more transmitters. The transmitter 44 performs the task of converting the baseband signal up to the RF. Each transmitter may include mixers 46, filters 48, and gain control stage 50. In some architectures of the RF subsystem, some of the components may be shared between the receiver section and the transmitter section. As shown, the receiver section 34 and the transmitter section 44 are coupled to an antenna 54 via a transmit/receive switch 56. Synthesizer 58 is also shown as coupling to the receiver section 34 and the transmitter section 44.

The input of each receiver is normally coupled with an antenna and the output of the receiver is normally coupled with ADC. The antenna, receiver, ADC and other related components are collectively referred herein as "receive chain." FIG. 5 illustrates the elements of a receive chain.

The input of each transmitter is normally coupled with DAC and the output of the transmitter is normally coupled with an antenna through a Power Amplifier (PA) which performs power amplification of the transmit signal. The antenna, PA, transmitter, DAC and other related components are collectively referred herein as "transmit chain." FIG. 6 illustrates the elements of a transmit chain.

Multiple transmit and/or receive chains are commonly used in many wireless communication systems for different purposes. Multiple transmit and/or receive chains in wireless communication systems offer spatial dimension that can be exploited in the design of a wireless communication system. Communication systems with multiple transmit and/or receive chains offer improved performance. The performance improvement can be in terms of better coverage, higher data rates, reduced SNR requirements, multiplexing of multiple users on the same channel at the same time, or some combination of the above. Different techniques using multiple receive and/or transmit chains are often referred to with different names such as diversity combining (maximum ratio combining, equal gain combining, selection combining, etc.), space-time coding (STC) or space-time block coding (STBC), spatial multiplexing (SM), beamforming and multiple input multiple output (MIMO). Normally wireless communication systems with multiple transmit chains at the transmit entity and multiple receive chains at the receive entity are referred as MIMO systems. As discussed in detail below, aspects of the invention described in this disclosure applies to the Spatial Multiplexing MIMO system i.e. a wireless communication system that uses Spatial Multiplexing technique using multiple transmit chains at the transmit entity and multiple receive chains at the receive entity.

In Spatial Multiplexing (SM), a high data rate signal is split into multiple lower data rate streams and each lower data rate stream may be transmitted from a different transmit antenna on the same frequency at the same time. Alternatively, data from two different users or applications may be transmitted from different transmit antennas on the same frequency at the same time. If signals from different transmit antennas arrive at the receiver antennas through sufficiently different spatial propagation paths, the receiver may be able to separate these streams of data, creating "parallel channels" on the same frequency at the same time. SM is a powerful technique for increasing channel capacity at higher Signal to Noise Ratio (SNR). The maximum number of spatially multiplexed data streams is limited by the minimum of the number of antennas at the transmit entity and the number of antennas at the receive entity. For example, if the number of transmit antennas at the transmit entity is four and the number of receive antennas at the receive entity is two, the maximum number of spatially separable data streams is two.

FIG. 7 illustrates an example of an SM-MIMO wireless communication system with four transmit chains at the transmit entity, for example the base station, and four receive chains at the receive entity, for example the client terminal.

The signal from a transmit chain arrives at all four receive chains through different propagation paths as shown in the FIG. 7. The receive signal at each receive chains may be a combination of signals transmitted from all four transmit chains and the noise as shown in FIG. 7.

The following notation is used in describing various signals in the remainder of the present invention. A subscript to a signal name denotes transmit or receive chain number to which the signal is associated. When there are two subscripts to a signal name, the first subscript refers to the transmit chain and the second subscript refers to the receive chain to which the signal is associated. Let $N_t$ denote the number of transmit chains and $N_r$ denote the number of receive chains. For SM the number of parallel data streams that can be supported is equal to the minimum of the number of transmit antennas $N_t$ and the number of receive antennas $N_r$. Normally a wireless communication system with $N_t$ transmit chains at the transmit entity and $N_r$ receive chains at the receive entity is referred as $N_t \times N_r$ MIMO communication system.

Wireless communication systems use different modulation techniques such as Quadrature Phase Shift Keying (QPSK), 16-Quadrature Amplitude Modulation (QAM), 64-QAM, etc. FIG. 8 illustrates a 16-QAM constellation and FIG. 9 illustrates a 64-QAM constellation. The set of all symbols in a given modulation technique is referred as constellation or alphabet. Let the total number of symbols in a constellation be denoted by L and the set of all symbols $a_k$ of a constellation be denoted by $A=\{a_k, \forall\ k=0, 1, 2, \ldots, L-1\}$. At a given instant, one symbol that represents the input data at the modulator is selected from the constellation for transmission.

Let the transmitted symbol at a given instant of time from the $i^{th}$ transmit chain be denoted by $s_i$ for $i=0, 1, \ldots, (N_t-1)$. Let the received symbol at a given instant of time at the $j^{th}$ receive chain be denoted by $x_j$ for $j=0, 1, \ldots, (N_r-1)$. Let the noise at a given instant of time at the $j^{th}$ receive chain be denoted by $n_j$ for $j=0, 1, \ldots, (N_r-1)$. The symbols $s_i$ used for transmission may be one of the symbols from the constellation of a selected modulation technique at the transmit entity.

The signal from one transmit antenna arrives at all the receive antennas through different propagation paths. When the physical distances between the antennas are sufficiently large relative to the wavelength of the radio frequency (RF) being used by the wireless communication system, the signals in different paths may undergo independent or mostly uncorrelated propagation. In practice, the propagation paths may not necessarily be completely independent but the correlation among various paths may generally be low when the antennas are sufficiently far apart. A Spatial Multiplexing decoder may be able to separate the spatially multiplexed data streams as long as correlation among different propagation paths is small.

Let channel conditions between transmit antenna i and receive antenna j be denoted by $h_{i,j}$, for $i=0, 1, \ldots, (N_t-1)$ and $j=0, 1, \ldots, (N_r-1)$.

Mathematically, the relationship between the transmitted symbols, the channel conditions, the noise and the received symbols can be expressed as follows for the case of a wireless communication system with four transmit chains and four receive chains:

$$x_0 = h_{0,0}s_0 + h_{1,0}s_1 + h_{2,0}s_2 + h_{3,0}s_3 + n_0 \quad (1)$$

$$x_1 = h_{0,1}s_0 + h_{1,1}s_1 + h_{2,1}s_2 + h_{3,1}s_3 + n_1 \quad (2)$$

$$x_2 = h_{0,2}s_0 + h_{1,2}s_1 + h_{2,2}s_2 + h_{3,2}s_3 + n_2 \quad (3)$$

$$x_3 = h_{0,3}s_0 + h_{1,3}s_1 + h_{2,3}s_2 + h_{3,3}s_3 + n_3 \quad (4)$$

In matrix notation, for the case of $N_t$ transmit chains and $N_r$ receive chains $$s = [s_0, s_1, \ldots, s_{N_t-1}]^T \quad (5)$$

$$x = [x_0, x_1, \ldots, x_{N_r-1}]^T \quad (6)$$

$$n = [n_0, n_1, \ldots, n_{N_r-1}]^T \quad (7)$$

$$H = \begin{bmatrix} h_{0,0} & h_{1,0} & & h_{N_t-1,0} \\ & & \cdots & \\ h_{0,1} & h_{1,1} & & h_{N_t-1,1} \\ \vdots & & \ddots & \vdots \\ h_{0,N_r-1} & h_{1,N_r-1} & \cdots & h_{N_t-1,N_r-1} \end{bmatrix} \quad (8)$$

$$x = Hs + n \quad (9)$$

In EQ. (9) s is the transmitted symbols vector, H is the channel matrix, n is noise vector and x is the received signal vector.

Normally, the receiver of the wireless communication system needs to estimate the channel conditions to process the received signals. Wireless communication systems use different techniques to enable the receiver to obtain estimates of channel conditions for different propagation paths between transmit and receive antenna pairs. Some techniques include embedding pilot symbols and/or training symbols along with the data symbols. Receivers normally use the embedded pilot symbols and/or training symbols to estimate the channel conditions. Some receivers may also use the previously decoded data symbols to estimate the channel conditions in addition to the pilot symbols and/or training symbols. In general, a receiver may employ combination of some or all of the available information to estimate the channel conditions. The receiver may use any of the algorithms available in the existing literature to estimate the channel conditions. It is understood that the receiver obtains the required estimates of the channel conditions through techniques known in literature or through some other techniques. Let the estimated channel conditions between transmit antenna i and receive antenna j is denoted by $\hat{h}_{i,j}$, for $i=0, 1, \ldots, (N_t-1)$ and $j=0, 1, \ldots, (N_r-1)$ and $\hat{H}$ denotes the matrix of estimated channel conditions.

At the receive entity, the received symbols vector x is known. The channel conditions matrix H may be approximated by the estimated channel conditions matrix $\hat{H}$. Based on these two known matrices, the transmitted symbols vector s may be estimated as $\hat{s}$ by solving the linear system of equations in EQ. 9.

The system of equations represented by EQ. 9 needs to be solved at a rate proportional to the data rate of the wireless communication system. Normally SM-MIMO is used to achieve high data rate in wireless communication systems. Hence the system of equations represented in EQ. 9 needs to be solved at a faster rate. For example, in a broadband wireless communication system that offers data rate of 16 megabits per second over the air using 4×4 SM-MIMO with 16-QAM modulation, EQ. 9 needs to be solved about one million times per second. Therefore, in general the complexity of the SM decoder is high. Further, the complexity of SM decoder normally grows exponentially as a function of the number of transmit chains and receive chains. Therefore, it is crucial to solve the system of equations represented by EQ. 9 in an efficient manner so that the wireless communication system can operate in real time with less processing resources and consumes less power.

There are different optimal and sub-optimal decoders described in the literature to solve the system of equations represented by EQ. 9. The Maximum Likelihood Decoder (MLD) is an optimal decoder for SM. Although MLD provides, theoretically, a best achievable decoding performance, its complexity and processing requirements are normally very high even for the common MIMO wireless communication systems such as 2×2 or 4×4 SM-MIMO with 16-QAM or 64-QAM.

QR Decomposition (QRD) in conjunction with M-algorithm, referred as QRD-M decoder and also called QRD-M method, is one of the commonly used sub-optimal SM decoders. A QRD-M sub-optimal SM decoder provides decoding performance close to that of the optimal SM decoder such as MLD, but requires reduced complexity and processing requirements. The reduced complexity and reduced processing requirements of QRD-M sub-optimal SM decoder makes it better suited for practical implementation. The QRD-M decoder used for SM is referred herein as QRD-M SM decoder.

SUMMARY OF THE INVENTION

Certain wireless communication systems employ MIMO transmission and reception schemes to increase performance and the data rate of the system. As noted above, Spatial Multiplexing may be employed in MIMO systems to increase the data rate of the communication system by transmitting multiple data symbols on different antennae at the same time on the same frequency. The complexity of decoding spatially multiplexed signals using the optimal Maximum Likelihood (ML) algorithm is generally very high and therefore the throughput is often limited by the processing capability of the receiver. The QR Decomposition with M-algorithm (QRD-M method) may be used for reduced complexity implementation of the SM-MIMO decoder. One of the disadvantages of the conventional QRD-M method is that the M-algorithm process is sequential when processing signals from multiple antennas. Also, the number of distance metrics computations is lower compared to the ML algorithm but still is fairly high. In addition, the QRD-M method requires search for the M best distance metrics at each processing stage. A new approach for decoding spatially multiplexed signals used in MIMO wireless communication systems is provided. Two different QR decompositions of the estimated channel matrix are performed, and two triangular matrices are produced, where one is right triangular and the other is left triangular. The two modified systems of equations in these matrices are processed in parallel using an M-algorithm process. After each M-algorithm process has processed half of the total number of stages, the total search space for the globally optimal transmitted symbol vector is reduced significantly. Finally, the cumulative distance metrics are computed for the symbol sequences in the reduced search space and the global minimum is determined for the estimated transmitted symbol vector. The new approach offers faster processing of the SM-MIMO signals and offers reduced distance metric computations and search operations at the cost of an additional QR decomposition. This approach is applicable to various MIMO configurations, but is especially beneficial for smaller SM-MIMO configurations such as 2-transmit and 2-receive SM-MIMO configuration. This approach offers reduction in power consumption, latency and/or increase in throughput.

Although the sub-optimal decoders are less complex and require less processing when compared to the optimal decoders, the complexity of the sub-optimal decoders still remain high. Therefore, it is desirable to further reduce the complexity of the sub-optimal decoders. Reduction in complexity results in less resource requirements and reduced power consumption. Since the decoding operations are performed at a very high rate such as millions of times per second, any reduction in processing requirements leads to significant reduction in power consumption, latency and/or increase in throughput. This, in turn, leads to more efficient resource use in users' portable wireless communication devices, such as those shown in FIGS. 2-4.

In accordance with one aspect of the invention, a method of decoding spatially multiplexed signals received by a wireless device is provided. The method comprises receiving, using a plurality of receive chains, spatially multiplexed signals including a plurality of symbols from a transmitting device; deriving, using one or more processing devices, an estimated channel matrix H from the plurality of received symbols; decomposing, using the one or more processing devices, the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix; applying, using the one or more processing devices, a first M-algorithm process to a bottom set of $N_r/2$ rows of a system of equations $y^1=R^1 s+w^1$ to obtain a first set of M candidates, wherein $N_r$ identifies a number of receive chains, $y^1$ is a first rotated received signal vector, s is a transmitted symbol vector and $w^1$ is a first rotated noise vector; applying, using the one or more processing devices, a second M-algorithm process to a top set of $N_r/2$ rows of a system of equations $y^2=R^2 s+w^2$ to obtain a second set of M candidates, wherein $y^2$ is a second rotated received signal vector and $w^2$ is a second rotated noise vector; performing, using the one or more processing devices, a distance determination over M*M candidates by combining the first and second sets of M candidates from the top set and the bottom set, wherein M identifies a number of candidate neighbors; and obtaining, using the one or more processing devices, a candidate from among the M*M candidates having a global minimum distance to select a final decoded symbol vector identifying a given one of the plurality of received symbols.

In one example, the first and second M-algorithm processes are done in parallel. In another example, the method further comprises demodulating the received symbols of $y^1$ and $y^2$ without computing any distance metrics. Here, the demodulation may performed by the one or more processing devices by quadrant based demodulation of the received symbols.

In a further example, the method additionally comprises selecting a set of $N_b$ nearest neighbor symbol sequences, wherein the number of nearest neighbor symbol sequences is constrained to be less than a constellation size L of the received symbols and greater than or equal to M. In one alternative, when $N_b$ is equal to M, the method includes completing any remaining M-algorithm processing. And in another alternative, when $N_b$ is greater than M, the method further comprises determining, by the one or more processing devices, distance metrics for the bottommost row of $y^1=R^1s+w^1$ over the $N_b$ candidates; selecting, from the determined distance metrics, the M candidates having the lowest distance for a next stage of M-algorithm processing; and completing any remaining M-algorithm processing.

In accordance with another aspect of the invention, a wireless receiver apparatus is provided. The receiver apparatus is configured to decode spatially multiplexed signals, and comprises a plurality of receive chains and one or more processing devices. The receive chains are configured to receive spatially multiplexed signals including a plurality of symbols from a transmitting device. The one or more processing devices are operatively coupled to the plurality of receive chains, and are configured to derive an estimated channel matrix H from the plurality of received symbols and decompose the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix. The processing device(s) is further configured to apply a first M-algorithm process to a bottom set of $N_r/2$ rows of a system of equations $y^1=R^1s+w^1$ to obtain a first set of M candidates, wherein $N_r$ identifies a number of receive chains, $y^1$ is a first rotated received signal vector, s is a transmitted symbol vector and $w^1$ is a first rotated noise vector, and to apply a second M-algorithm process to a top set of $N_r/2$ rows of a system of equations $y^2=R^2s=w^2$ to obtain a second set of M candidates, wherein $y^2$ is a second rotated received signal vector and $w^2$ is a second rotated noise vector. The processing device(s) is additionally configured to perform a distance determination over M*M candidates by combining the first and second sets of M candidates from the top set and the bottom set, wherein M identifies a number of candidate neighbors, and to obtain a candidate from among the M*M candidates having a global minimum distance to select a final decoded symbol vector identifying a given one of the plurality of received symbols.

In one example, the first and second M-algorithm processes are performed in parallel by the one or more processing devices. In another example, the one or more processing devices are further configured to demodulate the received symbols of $y^1$ and $y^2$ without computing any distance metrics. Here, the demodulation may be performed by the one or more processing devices by quadrant based demodulation of the received symbols.

In yet another example, the one or more processing devices are further configured to select a set of $N_b$ nearest neighbor symbol sequences, wherein the number of nearest neighbor symbol sequences is constrained to be less than a constellation size L of the received symbols and greater than or equal to M. According to one alternative, upon selection of $N_b$ to equal to M, the one or more processing devices are further configured to complete any remaining M-algorithm processing. And according to another alternative, when $N_b$ is selected to be greater than M, the one or more processing devices are further configured to: determine distance metrics for the bottommost row of $y^1=R^1s+w^1$ over the $N_b$ candidates; select the M candidates having the lowest distance for a next stage of M-algorithm processing; and complete any remaining M-algorithm processing.

In accordance with a further aspect of the invention, a non-transitory recording medium storing instructions thereon is provided. The instructions, when executed by one or more processing devices, cause the one or more processing devices to execute a method of decoding spatially multiplexed signals received by a wireless device. The method comprises receiving, using a plurality of receive chains, spatially multiplexed signals including a plurality of symbols from a transmitting device; deriving, using one or more processing devices, an estimated channel matrix H from the plurality of received symbols; decomposing, using the one or more processing devices, the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix; applying, using the one or more processing devices, a first M-algorithm process to a bottom set of $N_r/2$ rows of a system of equations $y^1=R^1s+w^1$ to obtain a first set of M candidates, wherein $N_r$ identifies a number of receive chains, $y^1$ is a first rotated received signal vector, s is a transmitted symbol vector and $w^1$ is a first rotated noise vector; applying, using the one or more processing devices, a second M-algorithm process to a top set of $N_r/2$ rows of a system of equations $y^2=R^2s+w^2$ to obtain a second set of M candidates, wherein $y^2$ is a second rotated received signal vector and $w^2$ is a second rotated noise vector; performing, using the one or more processing devices, a distance determination over M*M candidates by combining the first and second sets of M candidates from the top set and the bottom set, wherein M identifies a number of candidate neighbors; and obtaining, using the one or more processing devices, a candidate from among the M*M candidates having a global minimum distance to select a final decoded symbol vector identifying a given one of the plurality of received symbols.

In one example, the method further comprises demodulating the received symbols of $y^1$ and $y^2$ without computing any distance metrics. Here, the demodulation may be performed by the one or more processing devices by quadrant based demodulation of the received symbols.

In another example, the method further comprises selecting a set of $N_b$ nearest neighbor symbol sequences, wherein the number of nearest neighbor symbol sequences is constrained to be less than a constellation size L of the received symbols and greater than or equal to M. In one alternative, when $N_b$ is equal to M, the method further comprises completing any remaining M-algorithm processing. And in another alternative, when $N_b$ is greater than M, the method further comprises: determining, by the one or more processing devices, distance metrics for the bottommost row of $y^1=R^1s+w^1$ over the $N_b$ candidates; selecting, from the determined distance metrics, the M candidates having the lowest distance for a next stage of M-algorithm processing; and completing any remaining M-algorithm processing.

BRIEF DESCRIPTION OF THE DRAWINGS

FIG. 9 illustrates the constellation of 64-QAM, which may be employed with aspects of the invention described herein.

FIG. 13 illustrates an example of processing of the upper half and lower half of the system of equations for $N_r=4$ in accordance with aspects of the present invention.

FIG. 17 illustrates a table for nearest neighbor sequence symbols for the 16-QAM constellation, which may be employed with aspects of the invention described herein.

FIG. 18 contains table for nearest neighbor sequence symbols for the 64-QAM constellation, which may be employed with aspects of the invention described herein.

DETAILED DESCRIPTION

The present invention describes a method and apparatus of a QRD-M SM decoder that has reduced complexity and reduced latency when compared to that of the conventional QRD-M SM decoder. To describe the invention, the conventional QRD-M SM decoder is briefly described next.

Figure 10:
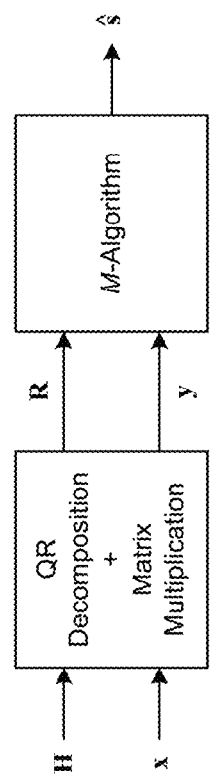
FIG. 10 illustrates a QRD-M SM decoder.

The conventional QRD-M SM decoder consists of two main processing blocks as shown in FIG. 10. The first main processing block is the QR decomposition and matrix multiplication and the second main processing block is the M-algorithm.

The QR decomposition block decomposes the channel matrix H into a right triangular matrix R and a unitary matrix Q using the QR matrix decomposition method. Specifically, $$H=QR \quad (10)$$

Since R is a right triangular matrix, all its elements below the main diagonal are zero. A property of a unitary matrix is that its inverse can be obtained by its Hermitian transpose. Specifically, $$Q^{-1}=Q^H \quad (11)$$

Therefore, $$Q^H Q = I \quad (12)$$

where I is an identity matrix. The Hermitian transpose of a unitary matrix is also a unitary matrix. Also when a vector is multiplied by a unitary matrix, the magnitude of the vector does not change. The unitary matrix Q is in general an $N_r \times N_r$ matrix. A discussion of the fundamentals of matrix computations may be found in the text entitled "Matrix Computations," The Johns Hopkins University Press, 2nd Ed., 1989, by G. H. Golub and C. F. Van Loan, the entire disclosure of which is hereby expressly incorporated by reference herein.

Substituting H from EQ. 10 in the expression for the received signal vector represented by EQ. 9:

$$x=QRs+n \quad (13)$$

Pre-multiplying both sides with $Q^H$, $$Q^H x = y = Q^H QRs + Q^H n = Rs + w \quad (14)$$

where y is the rotated received signal vector of x and w is the rotated noise vector of n. EQ. 14 becomes $$y=Rs+w \quad (15)$$

For the case of 4×4 SM-MIMO, the expanded version of EQ. 15 is as follows:

$$\begin{bmatrix} y_0 \\ y_1 \\ y_2 \\ y_3 \end{bmatrix} = \begin{bmatrix} r_{0,0} & r_{1,0} & r_{2,0} & r_{3,0} \\ 0 & r_{1,1} & r_{2,1} & r_{3,1} \\ 0 & 0 & r_{2,2} & r_{3,2} \\ 0 & 0 & 0 & r_{3,3} \end{bmatrix} \begin{bmatrix} s_0 \\ s_1 \\ s_2 \\ s_3 \end{bmatrix} + \begin{bmatrix} w_0 \\ w_1 \\ w_2 \\ w_3 \end{bmatrix} \quad (16)$$

In case the number of receive chains at the receive entity is greater than the number of transmit chains at the transmit entity, all the elements in the bottom $N_r$-$N_t$ rows of the right triangular matrix R are zero and the bottom $N_r$-$N_t$ rows of the column vector y are also zero after QR decomposition. Therefore, the system of equations represented by EQ. 15 is simplified to an $N_t \times N_t$ system of linear equations. In the remainder of this disclosure, the R matrix is considered to be an $N_t \times N_t$ matrix.

The second main processing block of the QRD-M SM decoder, namely the M-algorithm, is described next. The solution of the system of equations represented in EQ. 15 using the M-algorithm may be obtained in several stages. The number of stages in the M-algorithm corresponds to the number of rows in the system of equations and the M-algorithm is applied sequentially to each stage. The value of M in the M-algorithm refers to the number of "best symbol sequences" used for further consideration in a sequential decoding process. The best symbol sequences are the symbol sequences from the constellation selected based on minimum distance metrics. The M-algorithm for each stage includes two major processing steps. First, it computes all the distance metrics for a given stage. Next it selects M best symbol sequences for the next stage of processing. The selected M best symbol sequences are referred as "surviving symbol sequences" for the next stage. This process continues for all stages and at the last stage one best symbol sequence is selected as the decoded symbols vector ŝ.

A 4×4 SM-MIMO wireless communication system, as represented in EQ. 16, using 16-QAM modulation is chosen to illustrate the M-algorithm. For the chosen example, as represented in EQ. 16, the number of stages for M-algorithm is four. In QRD-M SM decoder, the M-algorithm starts by first operating on the bottom-most row corresponding to a single non-zero element in the R matrix. For the chosen example, as represented in EQ. 16, the M-algorithm starts with the fourth row containing the single non-zero element $r_{3,3}$ in matrix R.

To solve the equation represented by the bottom-most row containing a single non zero element, all possible values for $s_{(N_t-1)}$ from the constellation alphabet A used by the transmit entity may be multiplied with element $r_{(N_t-1),(N_t-1)}$ of matrix R and subtracted from element $y_{(N_t-1)}$ of vector y to compute the distance metrics $d_{(N_t-1)}$ for all possible values of $s_{(N_t-1)}$. For the chosen example, as represented in EQ. 16, to solve the equation represented by the fourth row containing a single non zero element $r_{3,3}$, all possible values for $s_3$ from the constellation alphabet A used by the transmit entity may be multiplied with $r_{3,3}$ and subtracted from $y_3$ to compute the distance metrics $d_3$ for all possible values of $s_3$. For the chosen example, as represented in EQ. 16, with 16-QAM modulation used by the transmit entity, the number of distance metric computations at the receive entity for the fourth row is 16, corresponding to 16 possible values for $s_3$.

For the chosen example, as represented in EQ. 16, M=8 is used for the M-algorithm. For the chosen example, as represented in EQ. 16, this results in the selection of 8 best symbol sequences with minimum distance metrics from the total of 16 distance metrics corresponding to L=16 symbol sequences. These selected 8 (M=8) symbol sequences are referred as surviving symbol sequences. At the first stage, the symbol sequences of length one and at the subsequent stages the symbol sequences grow by one symbol in length at each stage as the stages progress.

Next, the M-algorithm enters the second stage of processing. In the second stage of processing, the M-algorithm operates on row ($N_t$–2). For the chosen example, as represented in EQ. 16, the M-algorithm operates on the third row which is immediately above the fourth row. At the second stage of M-algorithm, there are 16 possible values for $s_2$ and 8 selected surviving symbol sequences from the previous stage. This requires 16×8=128 total number of distance metric computations corresponding to 128 different combinations of $s_2$ and $s_3$. The distance metrics computed in the second stage are cumulative distance metrics corresponding to the distance metric of a symbol sequence ($s_2$, $s_3$) and the distance metric of the selected surviving symbol sequences for $s_3$ during the first stage. The M-algorithm then selects 8 best surviving symbol sequences corresponding to the minimum cumulative distance metrics. The surviving symbol sequences are of length two at this stage.

Next, the M-algorithm enters the third stage of processing. In the third stage of processing, the IV-algorithm operates on row ($N_t$–3). For the chosen example, as represented in EQ. 16, the M-algorithm operates on the second row which is immediately above the third row. At the third stage of the M-algorithm, there are 16 possible values for $s_1$ and 8 selected surviving symbol sequences from the previous stage. This requires 16×8=128 total number of distance metric computations corresponding to 128 different combinations of $s_1$, $s_2$ and $s_3$. The distance metrics computed in the third stage are the cumulative distance metrics corresponding to the distance metric of a symbol sequence ($s_1$, $s_2$, $s_3$) and the distance metric of the selected surviving symbol sequence for ($s_2$, $s_3$) during the second stage. Next, the M-algorithm selects 8 best surviving symbol sequences corresponding to the minimum cumulative distance metrics. The surviving symbol sequences are of length three at this stage.

Figure 11:
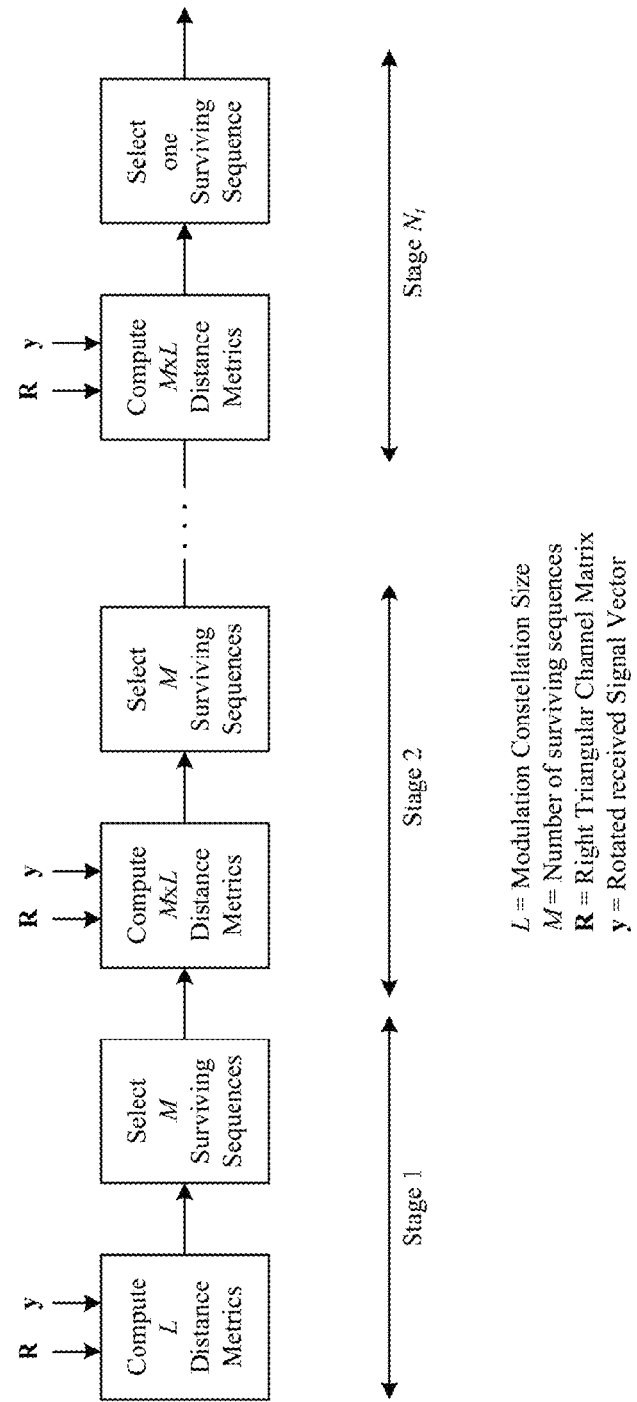
FIG. 11 illustrates the general processing flow diagram of the M-algorithm.

This process continues for each stage until the last stage, which corresponds to the first row of EQ. 16, is reached. After computing the cumulative distance metrics for the last stage, one best surviving symbol sequence is selected as the decoded symbols vector ŝ. In case where the decoding is successful the decoded symbols vector is equal to the transmitted symbols vector, i.e., ŝ=s. For the chosen example, as represented in EQ. 16, at the last stage the M-algorithm operates on the first row. Therefore, at the last stage of the M-algorithm, there are 16 possible values for $s_0$ and 8 selected surviving symbol sequences from previous stage. This requires 16×8=128 total number of distance metric computations corresponding to 128 different combinations of $s_0$, $s_1$, $s_2$ and $s_3$. The distance metrics computed in the last stage are the cumulative distance metrics corresponding to the distance metric of a symbol sequence ($s_0$, $s_1$, $s_2$, $s_3$) and the distance metric of the selected surviving symbol sequence ($s_1$, $s_2$, $s_3$) during the third stage. Next, the M-algorithm selects one best surviving symbol sequence $\hat{s}=[\hat{s}_0, \hat{s}_1, \hat{s}_2, \hat{s}_3]^T$ corresponding to the minimum cumulative distance metric. FIG. 11 shows the general processing flow diagram of the M-algorithm for $N_t$ stages.

The value of M may be chosen according to the required decoding performance and processing complexity tradeoff. The smaller the value of M, the lesser the complexity and processing requirements, which leads to reduction in power consumption. However, a smaller value of M also reduces the decoding performance.

Two major areas of complexity in the M-algorithm for each stage are: the computation of distance metrics and selection of best surviving symbol sequences corresponding to the minimum distance metrics. The computation of distance metrics in general may require complex multiplications. Since there may be hundreds of distance metric computations for one pass of QRD-M SM decoder, the number of required complex multiplications is generally high. Although the complexity of the computation of distance metrics is high, it may be pipelined and/or parallelized in a VLSI implementation to reduce latency. However, the operation to select M best surviving symbol sequences involves extensive memory access, conditional branching, element swapping, and so forth depending on the ordering feature of the input sequences and therefore the operation to select M best surviving symbol sequences may be difficult to pipeline and/or parallelize. Therefore, the processing latency of the QRD-M SM decoder normally depends on the processing latency of the operation that selects the M best surviving symbol sequences. Furthermore, the next stage of processing may not start until the M best surviving symbol sequences for the current stage have been identified.

In general, when using an $N_t \times N_r$ SM, there will be $N_t$ processing stages in the M-algorithm of the QRD-M SM decoder. If a modulation scheme with constellation size L is used by the transmit entity, then the following distance metrics computations may be performed by a traditional M-algorithm:

For the first stage: L distance metric computations over symbol sequences consisting of length one.

For the second stage: M×L distance metric computations over symbol sequences consisting of length two.

For the third stage: M×L distance metric computations over symbol sequences consisting of length three.

For the $N_t$-th stage: M×L distance metric computations over symbol sequences consisting of length $N_t$.

In addition to the distance metric computations, the following selection operations may be performed based on minimum distance metrics:

For the first stage: M surviving symbol sequences out of L symbol sequences.

For each intermediate stage: M surviving symbol sequences out of M×L symbol sequences For the last stage: one surviving symbol sequence out of M×L symbol sequences.

Aspects of the invention described herein provide a method and apparatus to achieve decoding performance similar to that of the conventional M-algorithm but with reduced processing requirements and reduced processing latency. This may enable the implementation of a QRD-M SM decoder that may have lower processing latency and reduced power consumption. These can be substantial advantages for portable wireless communication devices such as a cellular phone, laptop, netbook, etc.

This improved and more efficient processing may be performed by one or more DSPs, microcontrollers, hardware accelerators, co-processors or a combination of any of such processing devices, which receive signals from multiple receive chains. This may be done in conjunction with internal memory, including a stack or buffer memory, with external memory, or both. The results of the processor-generated determination are used to decoding spatially multiplexed signals in a MIMO wireless communication systems and to provide efficient communication between the receiving device and other devices.

According to an aspect of the present invention, the channel matrix H is decomposed into two different triangular matrices. The first QR decomposition is performed as described above for the normal QRD-M SM decoder. The first QR decomposition results in the first unitary matrix $Q^1$ and first triangular matrix $R^1$ as shown below in EQ. 17 for the case of $N_t=4$.

$$R^1 = \begin{bmatrix} r^1_{0,0} & r^1_{1,0} & r^1_{2,0} & r^1_{3,0} \\ 0 & r^1_{1,1} & r^1_{2,1} & r^1_{3,1} \\ 0 & 0 & r^1_{2,2} & r^1_{3,2} \\ 0 & 0 & 0 & r^1_{3,3} \end{bmatrix} \quad (17)$$

The second QR decomposition results in the second unitary matrix $Q^2$ and second triangular matrix $R^2$ as shown below in EQ. 18 for the case of $N_t=4$.

$$R^2 = \begin{bmatrix} r^2_{0,0} & 0 & 0 & 0 \\ r^2_{1,0} & r^2_{1,1} & 0 & 0 \\ r^2_{2,0} & r^2_{2,1} & r^2_{2,2} & 0 \\ r^2_{3,0} & r^2_{3,1} & r^2_{3,2} & r^2_{3,3} \end{bmatrix} \quad (18)$$

As observed from EQ. 17, the matrix $R^1$ is an upper right triangular matrix and that from EQ. 18, the matrix $R^2$ is a lower left triangular matrix. Using the two different QR decompositions in EQ. 13 and pre-multiplying both sides of the equation with $Q^{1H}$ and $Q^{2H}$ respectively, two different systems of equations are obtained as follows.

$$y^1 = R^1 s + w^1 \quad (19)$$

and $$y^2 R^2 s + w^2 \quad (20)$$

where $$y^1 = Q^{1H} x$$

$$y^2 = Q^{2H} x$$

and $$w^1 = Q^{1H} n$$

$$w^2 = Q^{2H} n$$

Figure 12:
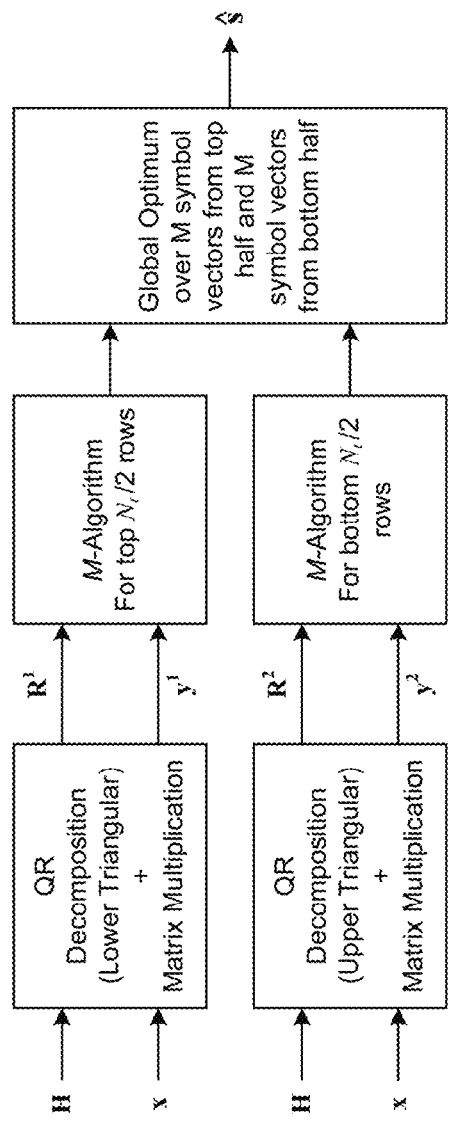
FIG. 12 illustrates an example of a Dual M-approach in accordance with aspects of the present invention.

According to another aspect of the invention the M-algorithm process is used for the first stage of processing on both systems of equations represented in EQ. 19 and EQ. 20. This is herein referred to as "dual M-algorithm processing" as shown in FIG. 12. This results in L distance metric computations for each system of equations for the first stage. After computing the distance metrics, the best M symbol sequences are used for considerations in the next step of M-algorithm processing in both systems of equations. The second stage of processing is also applied to each system of equations. This results in M×L distance metric computations for symbol sequences having a length of two for each system of equations. This dual M-algorithm processing continues until $N_t/2$ stages have been processed for both the systems of equations. At this point, the bottom $N_t/2$ rows of the system of equations have been processed by the first M-algorithm process operating on system of equations represented by EQ. 19 and the top $N_t/2$ rows of the system of equations have been processed by the second M-algorithm process operating on system of equations represented by EQ. 20. For both of the M-algorithm processes there are M best symbol sequences remaining after the $N_t/2$ stages of processing. FIG. 13 shows an example of the dual M-algorithm for the case of $N_t=4$.

The surviving symbol sequences for the first M-algorithm process, when applied to the system of equations represented by EQ. 19, correspond to the symbol sequences $s_{n_t/2}$ to $s_{n_t-1}$ of the transmitted symbol vector s. The surviving symbol sequences for the second M algorithm process, when applied to the system of equations represented by EQ. 20, correspond to the symbol sequences $s_0$ to $$\frac{s_{n_t}}{2} - 1$$

of the transmitted symbol vector s. The decision for the globally optimum symbol sequence for the entire transmit symbol vector s may be obtained by performing joint distance metric computations for all the possible combinations of the M surviving symbol sequences from each of the M-algorithm processes.

There are total of $M^2$ possible symbol sequence combinations and $M^2$ distance metric computations to be performed. The distance metrics may be computed either using the first row of the first system of equations represented in EQ. 19 or the last row of the second system of equations represented in EQ. 20. The joint distance metrics are computed for the symbol vector of length $N_t$ with only $M^2$ possible symbol sequence combinations. As the distance metrics are computed, a current minimum distance metric and its corresponding symbol sequence are maintained. The final remaining symbol sequence corresponding to the joint minimum distance metric is the decoded symbol sequence.

Figure 14:
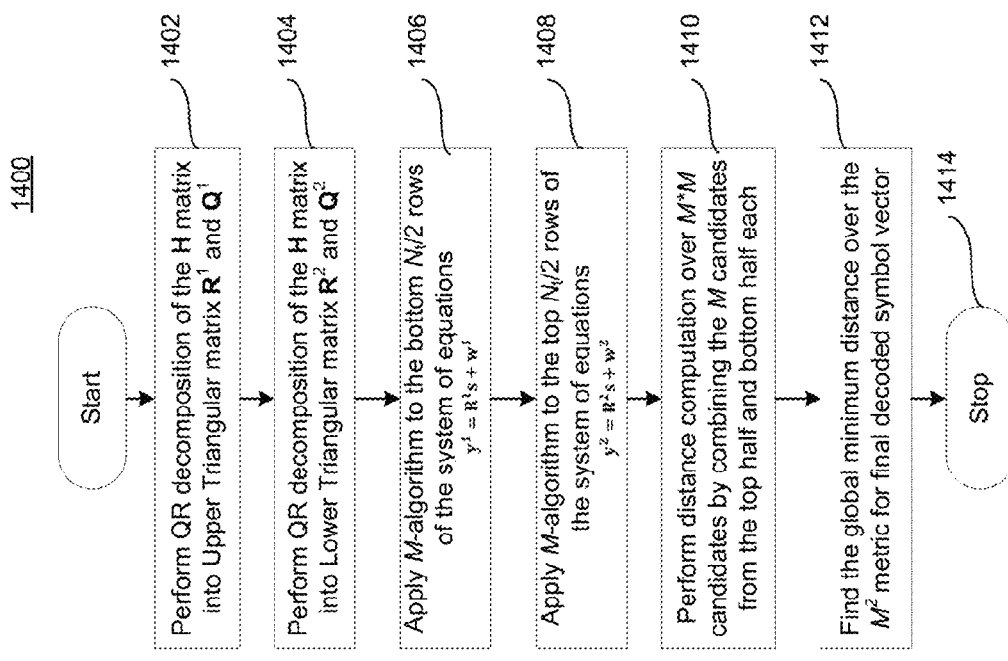
FIG. 14 illustrates an example processing flow diagram of a dual M-algorithm approach in accordance with aspects of the present invention.

The overall processing flow for the dual M-algorithm is as per the flowchart 1400 contained in FIG. 14. Unless expressly stated herein or constrained by prior operations, the processing stages may be performed in a different order or concurrently. At processing stage 1402, the channel matrix H is decomposed into an upper triangular matrix $R^1$ and $Q^1$. At processing stage 1404, the same channel matrix H is decomposed into an upper triangular matrix $R^2$ and $Q^2$. At processing stage 1406 the M-algorithm is applied to the bottom two rows of the system of equations in EQ. 19. The output of processing step 1406 is a set of M surviving symbol vectors of length $N_t/2$ corresponding to the top half of the transmitted symbol vector s. At processing stage 1408 the M-algorithm is applied to the top two rows of the system of equations in EQ. 20. The output of processing step 1408 is a set of M surviving symbol vectors of length $N_t/2$ corresponding to the top half of the transmitted symbol vector s. At stage 1410 the two sets of symbols vectors of size M are used to compute distance over symbol vectors of length $N_t$ over a set of $M^2$ candidates. Finally, at stage 1412 the symbol vector with the smallest distance is used as the decoded symbol vector. The process preferably terminates at stage 1414. Each of these stages of the process may be implemented by one or more processors and memory as discussed above.

For the case of 2×2 SM-MIMO, the demodulation using the aspects of the present invention may be performed as follows. First the 2×2 channel matrix is decomposed into two different triangular matrices as described earlier. This results in one upper triangular and one lower triangular matrix as shown below.

$$R^1 = \begin{bmatrix} r^1_{0,0} & r^1_{1,0} \\ 0 & r^1_{1,1} \end{bmatrix} \quad (21)$$

$$R^2 = \begin{bmatrix} r^2_{0,0} & 0 \\ r^1_{0,1} & r^2_{1,1} \end{bmatrix} \quad (22)$$

The two systems of equations using the two different triangular matrices may be solved in parallel. The first M-algorithm process performs the first stage of processing corresponding to the second row (bottom most) of the system of equations using $R^1$. Similarly, the second M-algorithm process performs the first stage of processing corresponding to the first row of the system of equations using $R^2$. Next, the joint distance metrics are computed for the symbol vector of length $N_t=2$ with only $M^2$ possible sequences. As the distance metrics are computed, the current minimum distance metric and its corresponding symbol sequence are maintained. The final remaining symbol sequence corresponding to the joint minimum distance metric is the decoded symbol sequence.

For the case of 2×2 MIMO configuration with 64-QAM and M=4, the following computations are performed. At the first stage of processing, L distance metrics for each of the system of equations are performed. In this chosen example, L=64, therefore 2×64=128 distance metric computations are performed over symbol sequences of length one. Next M×M=16 joint distance metrics are computed over a symbol sequences of length two. For the chosen example, when the conventional M-algorithm is used, there are L=64 distance metric computations over symbol sequences of length one in the first stage and M×L=256 distance metric computations over symbol sequences of length two for the second stage. The distance metric computations over symbol sequences of length two requires additional number of operations when compared to the first stage of distance metric computations over symbol sequences of length one. The present invention achieves reduction in the overall computations for the demodulation of the transmitted symbol vector, which as noted above may result in significant resource and/or power savings for the communication device.

In accordance with one aspects of the present invention, a higher value of M may result in a relatively smaller increase in the computation complexity.

Figure 15:
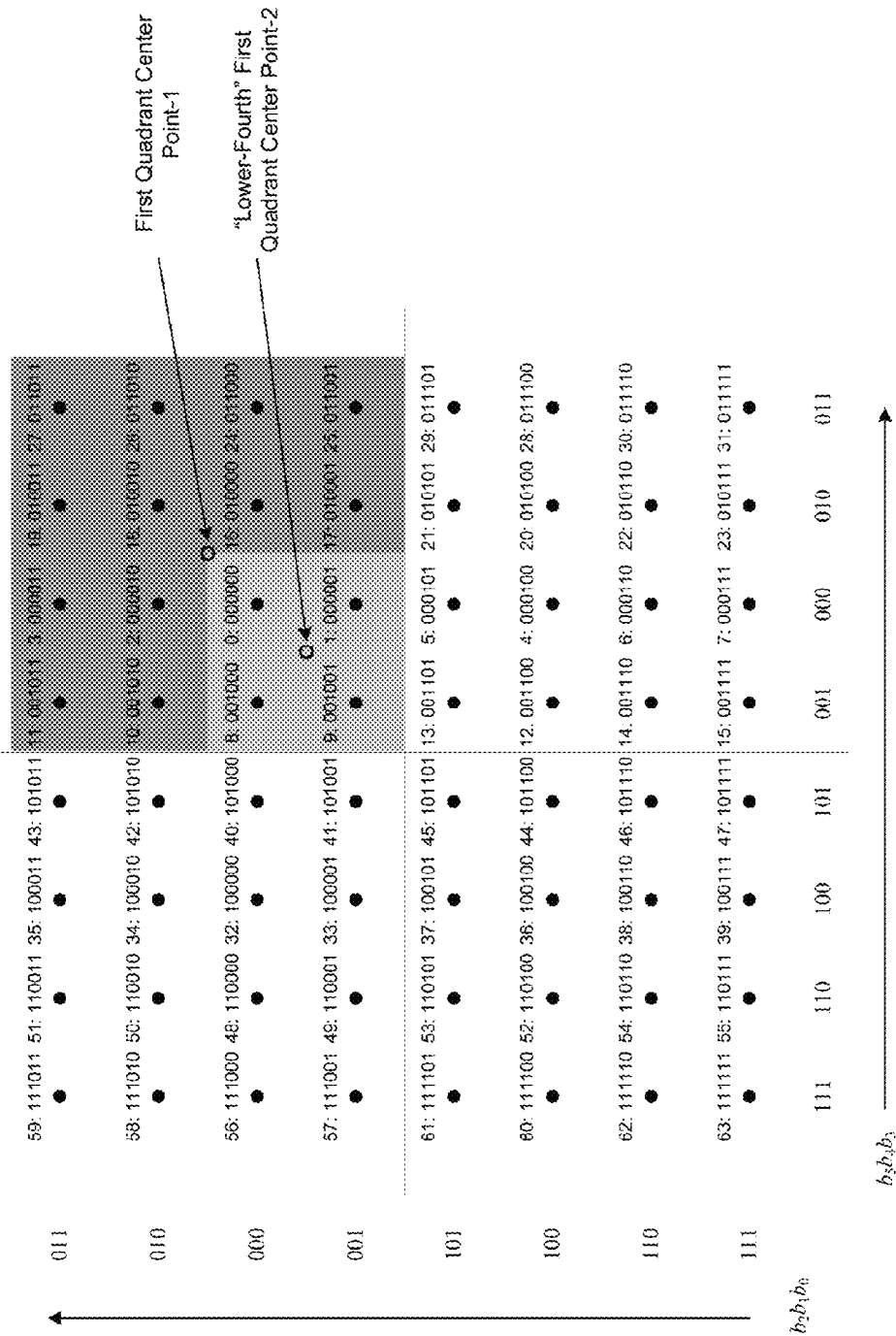
FIG. 15 illustrates an example of a center point of a quadrant for 64-QAM constellation.
Figure 16:
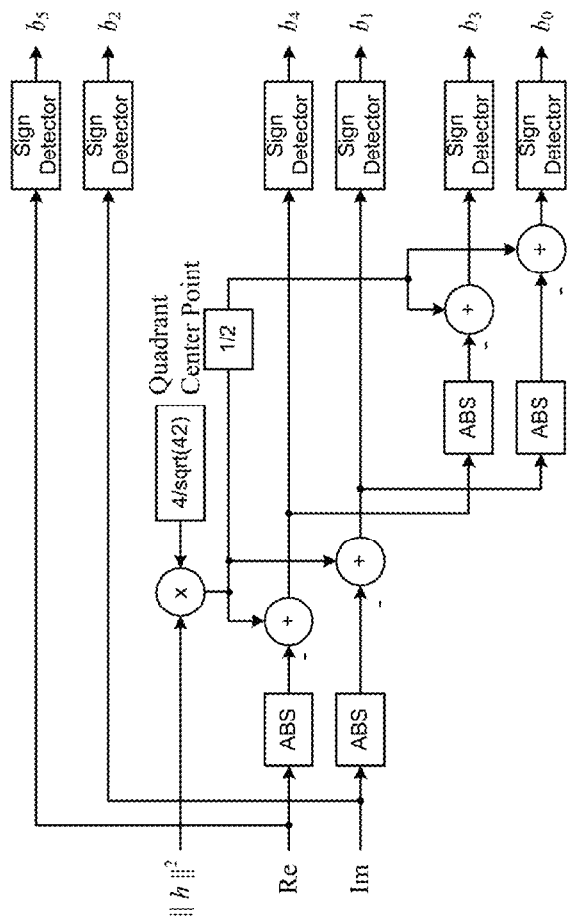
FIG. 16 illustrates an example quadrant based demodulator for 64-QAM.

The demodulation of the first stage received symbol may be performed without computing any of the L distance metrics. This may be achieved by quadrant based demodulation of the received symbol as described below for the 64-QAM constellation shown in FIG. 15. First the sign of the real component is used to determine the value of bit $b_5$. Similarly, the sign of the imaginary component is used to determine the value of the bit $b_2$. Next, the absolute value of the received symbol sequence is subtracted from the center point of the first quadrant of the 64-QAM constellation as shown in FIG. 16. The resultant signal is then used to demodulate the next pair of bits as follows. The sign of the real component is used to determine the value of bit $b_4$. Similarly, the sign of the imaginary component is used to determine the value of the bit $b_1$. Next, the absolute value of the residual signal from the previous stage is then subtracted from the center point of the lower one fourth of the first quadrant as shown in FIG. 16. The resultant signal is then used to demodulate the next pair of bits as follows. The sign of the real component is used to determine the value of bit $b_3$. Similarly, the sign of the imaginary component is used to determine the value of the bit $b_0$. Thus, the 64-QAM received symbol may be demodulated in three steps without computing any distances.

Figure 8:
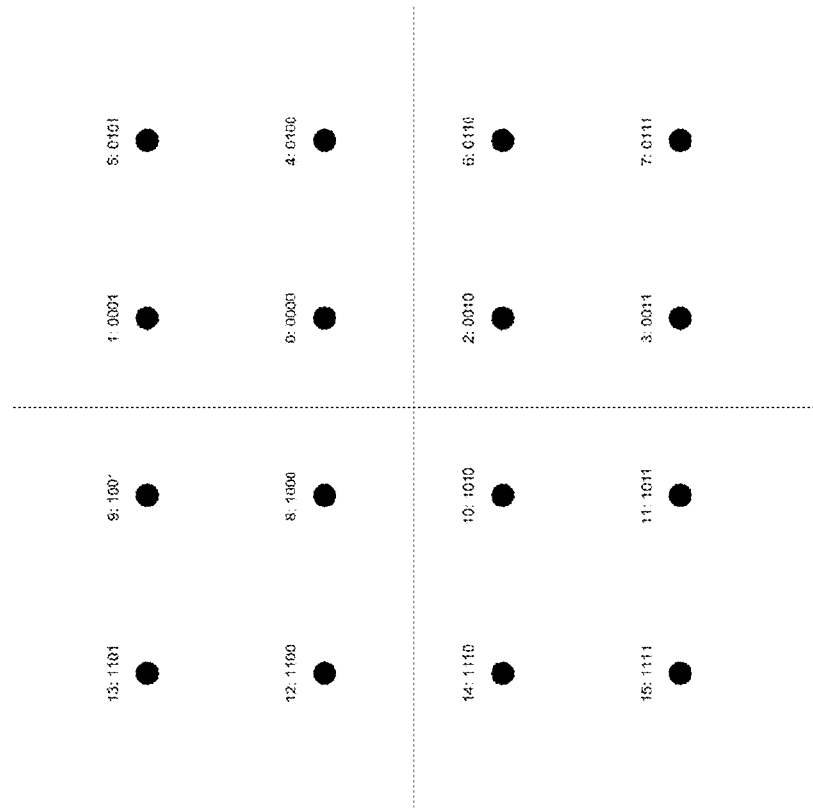
FIG. 8 illustrates the constellation of 16-QAM, which may be employed with aspects of the invention described herein.
Figure 9:
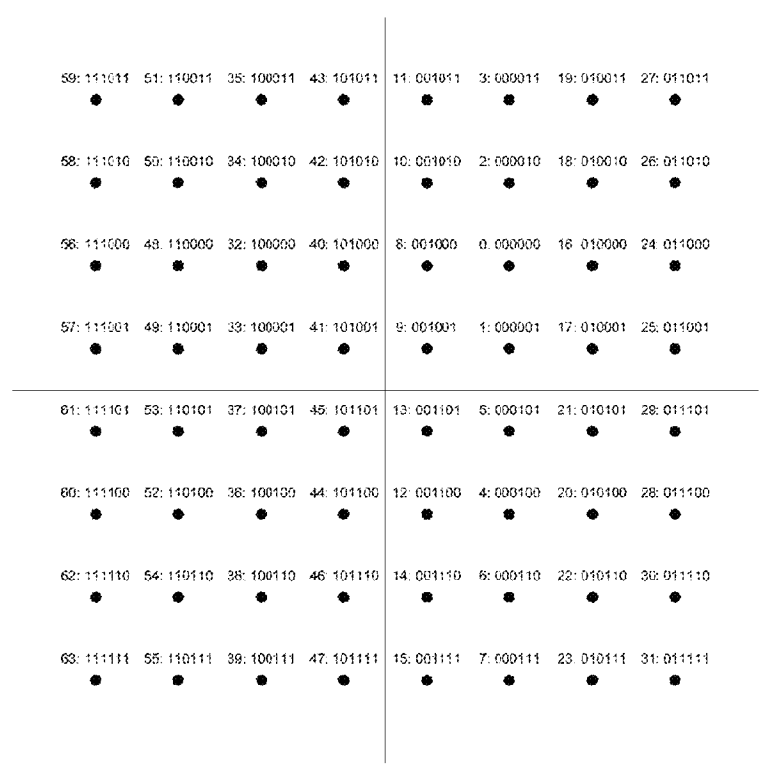

Since the first stage of the demodulation involves only one received symbol, such individual symbol demodulation is suitable. However, this only provides one of the M total symbol sequences needed for the next stage of processing. Therefore the remaining M−1 best symbol sequences for the next stage of processing may need to be determined. According to a method described in the Low Latency application, this may be accomplished as follows. The nearest neighbor symbol sequences for the constellation may be pre-computed and stored in a ROM table. The pre-computed nearest neighbor symbol sequences table may be used as an approximation to the actual nearest M symbol sequences that may be closest to the received symbol sequence. Examples of such nearest neighbor symbol sequences tables for the 16-QAM and 64-QAM constellations of FIG. 8 and FIG. 9 are provided in the tables contained in FIG. 17 and FIG. 18 respectively. According to an aspect of the present invention, the approximation for the best M symbol sequences may be improved as follows. Let the number of nearest neighbor symbol sequences stored in the pre-computed table for each symbol sequence in the constellation be denoted by $N_b$. Clearly, $N_b$ must be greater than or equal to M but less than L. If $N_b$ is chosen to be greater than M, then the receiver may compute the distance metrics for $N_b$ pre-computed nearest neighbor symbol sequences only. Next, the receiver may search the $N_b$ distance metrics for the M minimum distance metrics. This reduces the complexity from computing L (size of constellation) distance metrics to $N_b$ distance metrics. Also, the search is reduced from M out of L distance metrics to M out of $N_b$ distance metrics. For example, in case of 64-QAM (L=64), M=4, and $N_b$=8, the distance metrics computation is reduced from 64 to only 8. The search has been reduced from 4 out of 64 to only 4 out of 8 distance metrics.

In accordance with aspects of the present invention, the quadrant based demodulation may be applied to first stage of processing for both the first and the second systems of equations represented by EQ. 19 and EQ. 20. Next, the nearest neighbor symbol sequences for each of the demodulated symbols for the two systems of equations are determined based on the pre-computed nearest neighbor symbol sequence tables.

Figure 19:
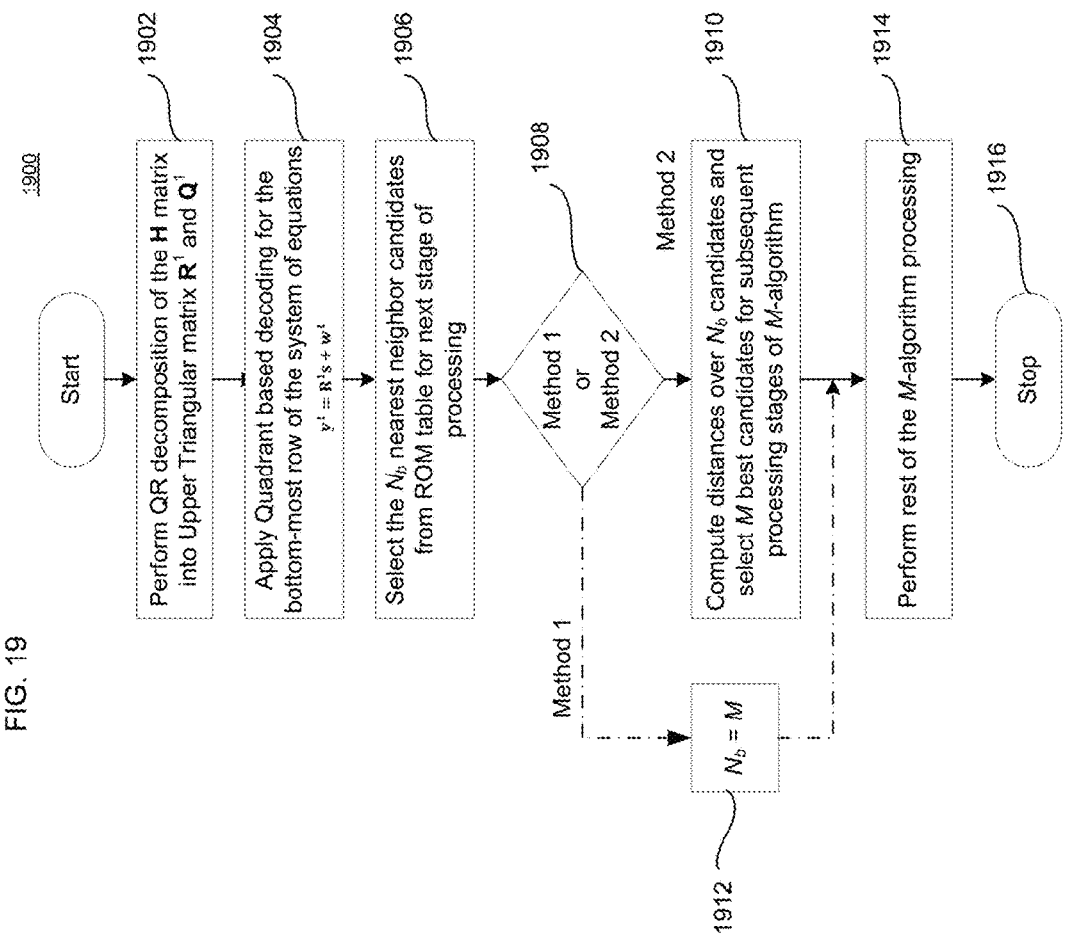
FIG. 19 illustrates example processing of the first stage of an M-algorithm using quadrant based demodulation and pre-computed nearest neighbor tables in accordance with aspects of the present invention.

According to an aspect of the present invention, at this point there are two different methods for further demodulation and each of them is described next. These methods are illustrated in FIG. 19. In Method 1, the $N_b$ nearest neighbor symbol sequences corresponding to the demodulated symbol sequences at the first stage are used as M best symbol sequences for subsequent stages of processing. In this case $N_b$=M. In Method 2 the $N_b$ nearest neighbor symbols corresponding to the demodulated symbol sequences determined from the pre-computed tables are used as symbol sequences for distance metric computation in the first stage of each of the two M-algorithm processes. After the $N_b$ distance metrics are computed for each of the M-algorithm processes, the distance metrics are searched for the M smallest distance metrics from the $N_b$ distance metrics for each of the two M-algorithm processes. Once the best M symbol sequences are determined for each of the M-algorithm processes, they are used as the best symbol sequences for subsequent stages of processing in the respective M-algorithm process.

The overall processing flow for the quadrant based decoding in conjunction with nearest neighbor lookup tables is as per the flowchart 1900 contained in FIG. 19. The first stage of the processing 1902 is the QR decomposition of the channel matrix. At the processing stage 1904 the bottom-most row which consists of a single unknown variable is processed according to the quadrant based decoding method as per FIG. 15 and FIG. 16. Next at the processing stage 1906 the $N_b$ nearest neighbors are selected from a pre-computed tables stored in a ROM as shown in FIG. 17 and FIG. 18 depending on modulation type. At processing stage 1908 a decision is made where a Method 1 or Method 2 is to be used. If Method 1 is to be used, the number of nearest neighbors is selected to be equal to M at processing stage 1912. If Method 2 is to be used, the processing continues in block 1910 where the number of nearest neighbors is selected to be greater than M and the distance metrics are computed for the bottom most row over the $N_b$ candidates and from those M candidates with the lowest distance are selected for the next stage of M-algorithm processing. At processing stage 1914 the rest of the M-algorithm processing is performed. The process preferably terminates at stage 1916.

The processing steps as illustrated in FIG. 19 are applied to the systems of equations in EQ. 19 and EQ. 20. The last two processing steps of computing distance over M*M candidates and selecting the candidate with lowest metric are then applied as per processing stages 1410 and 1412 in FIG. 14.

For the case of 2×2 MIMO configuration with 64-QAM when processing the first stage symbol sequence using the quadrant based demodulation, the two demodulated symbol sequences may be obtained without any distance metric computations. The symbol sequences to be considered for joint demodulation of the transmitted symbol vector s, the nearest neighbor symbol sequences for each of the demodulated symbol may be used. According to one method, the $N_b$ neighbor symbol sequences of the demodulated symbol for the first M-algorithm process and the $N_b$ neighbor symbol sequences of the demodulated symbol for the second M-algorithm process may be considered for the joint demodulation of the entire transmitted symbol vector s. This requires total of $N_b \times N_b$ distance metric computations over a symbol vector of length two. Alternatively, the demodulated symbol at the first stage may be used to narrow the list of symbol sequences for which the distance metrics are computed. Specifically, instead of distance metric computations over the entire constellation alphabet of L, only $N_b$ distance metrics may be computed. Next the best M symbol sequences with the smallest distance metrics may be chosen for further processing. In this method, the two M-algorithm processes perform 2×$N_b$ distance metric computations for the first stage and then M×M distance metric computations for the joint demodulation of the transmitted symbol vector s. When compared to conventional M-algorithm approach, which requires 2*L first stage distance metric computations and L×M second stage distance metric computations over symbol sequences of length two, significant computation and/or power savings may be obtained.

Figure 1:
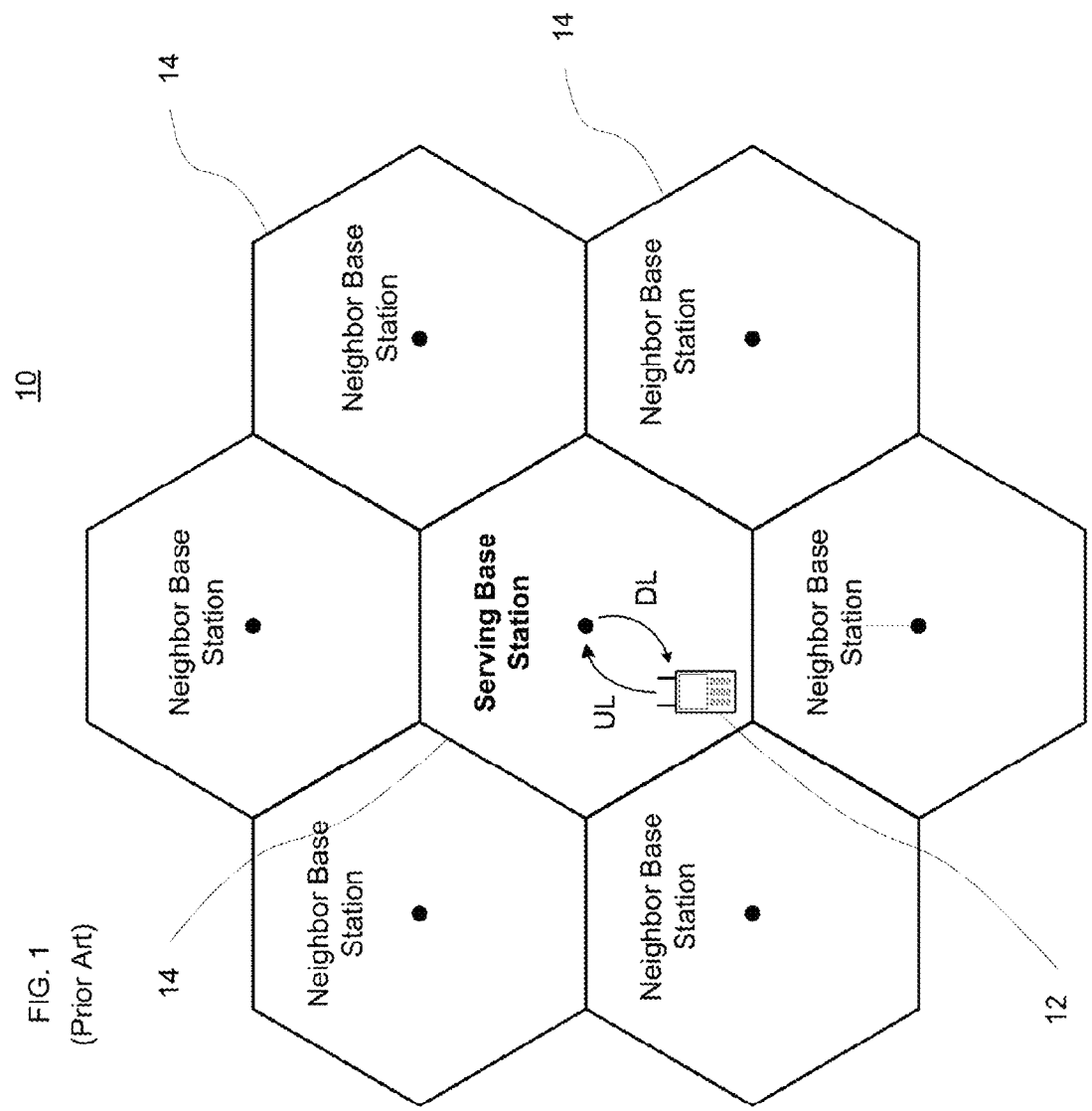
FIG. 1 illustrates a conventional mobile wireless communication system.
Figure 2:
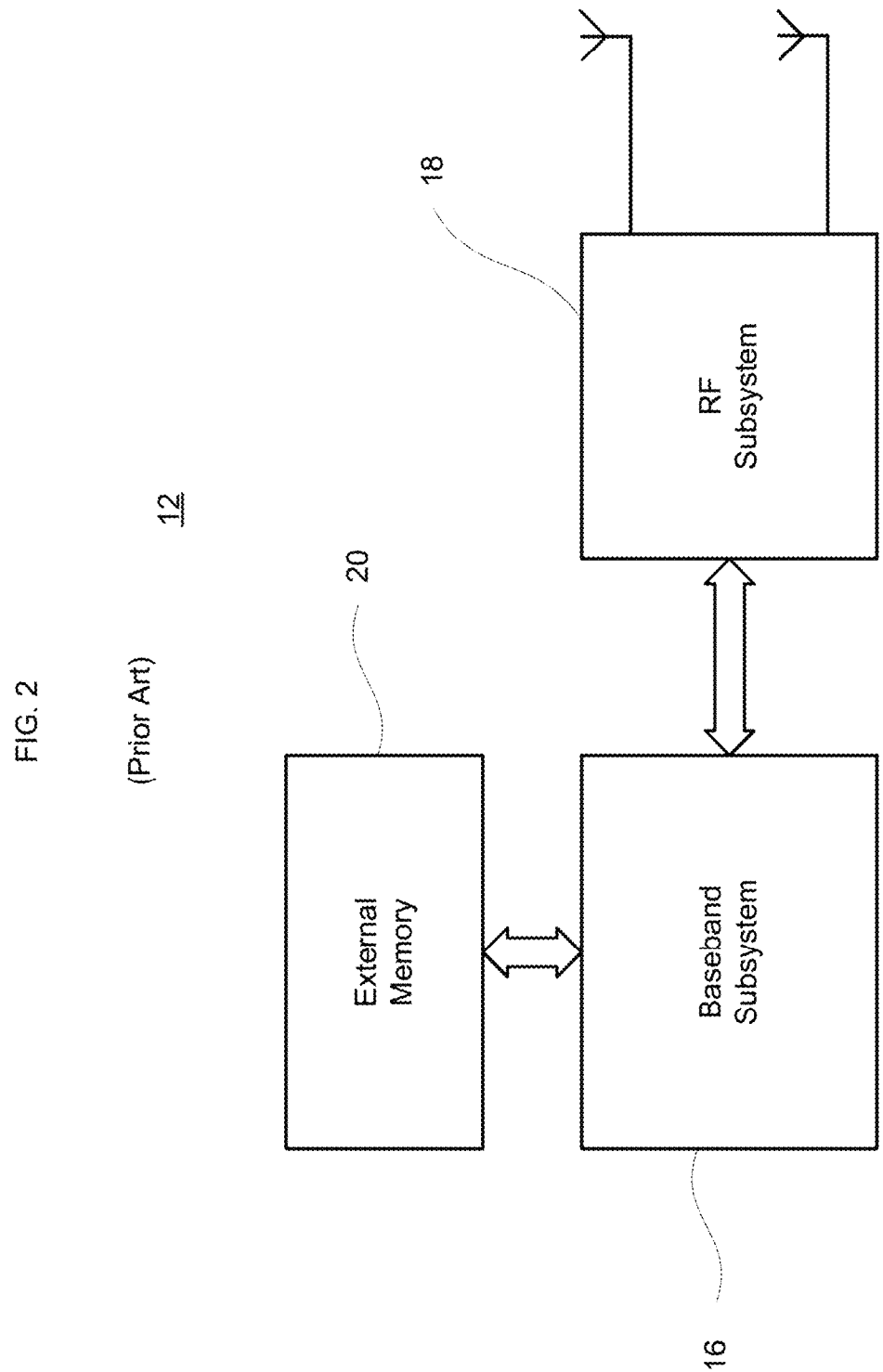
FIG. 2 illustrates a wireless mobile station diagram, which may be employed with aspects of the invention described herein.
Figure 3:
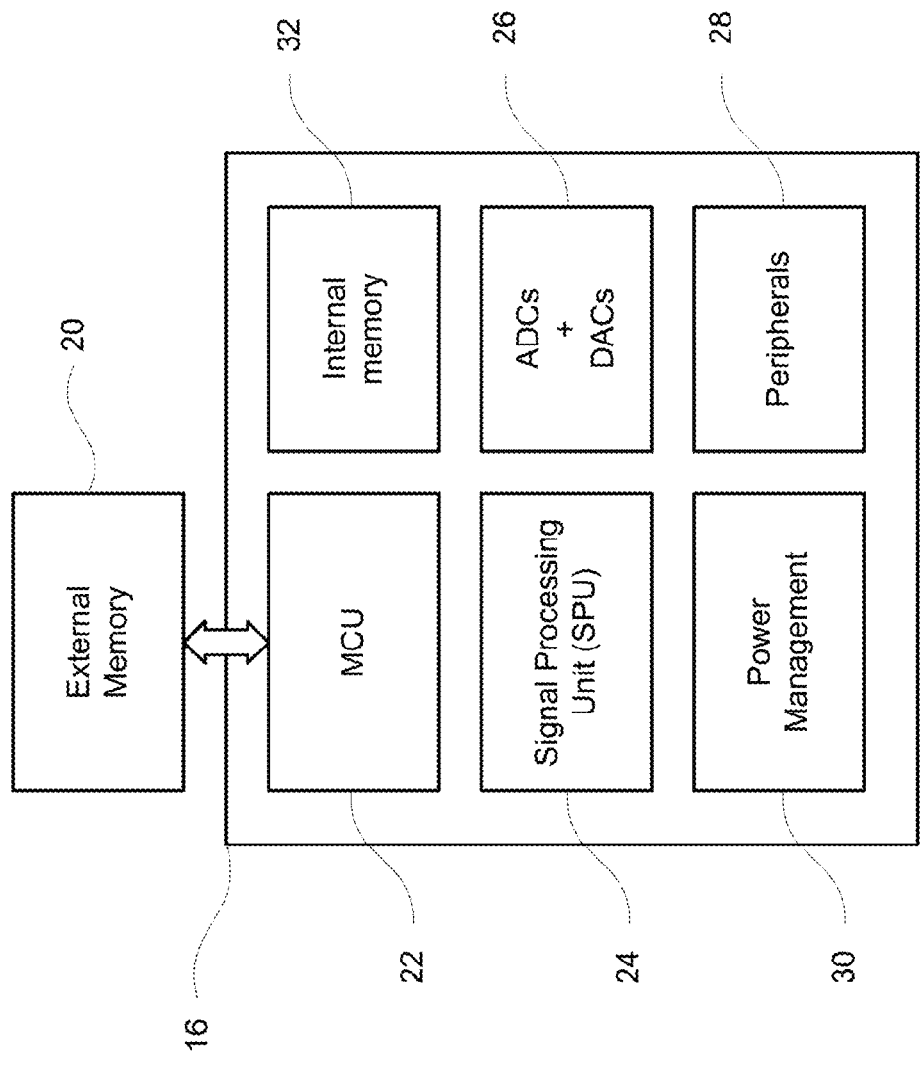
FIG. 3 illustrates a baseband subsystem for a wireless mobile station, which may be employed with aspects of the invention described herein.
Figure 4:
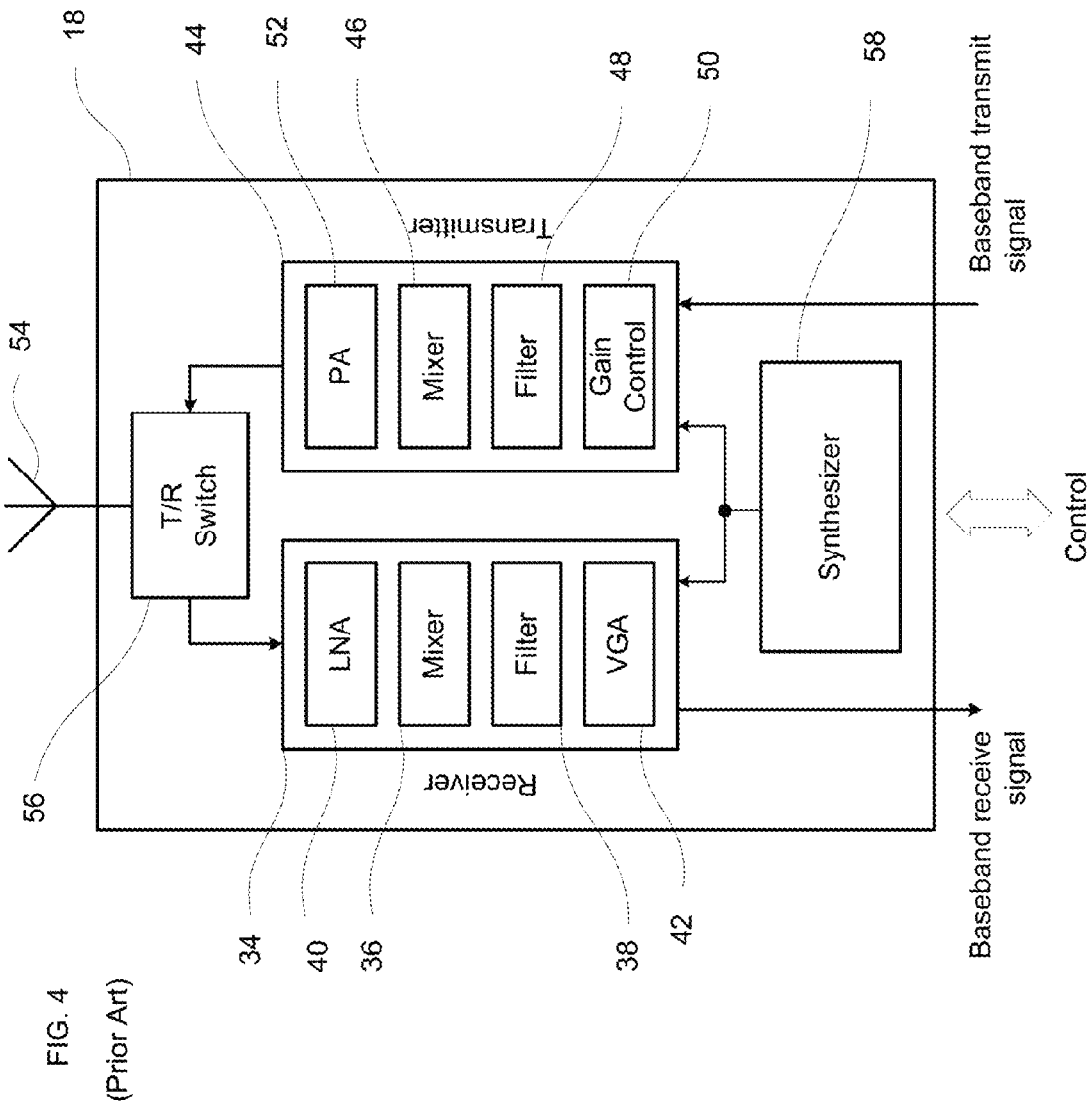
FIG. 4 illustrates an RF subsystem for a wireless mobile station, which may be employed with aspects of the invention described herein.
Figure 6:
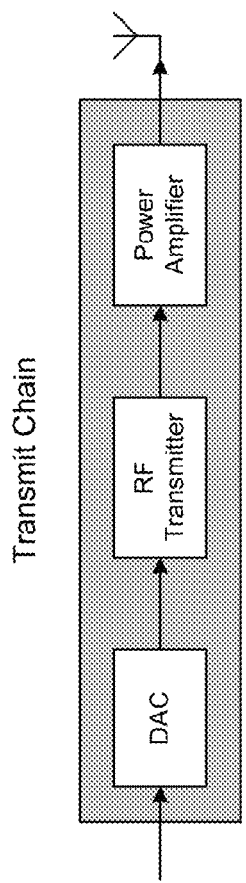
FIG. 6 illustrates the transmit chain of a wireless communication system, which may be employed with aspects of the invention described herein.
Figure 5:
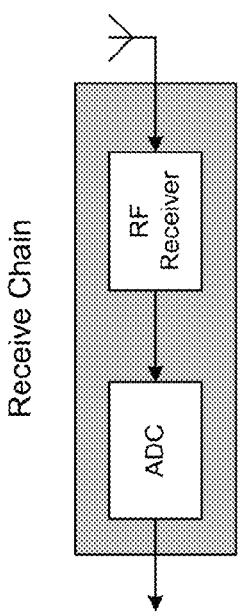
FIG. 5 illustrates the receive chain of a wireless communication system, which may be employed with aspects of the invention described herein.
Figure 7:
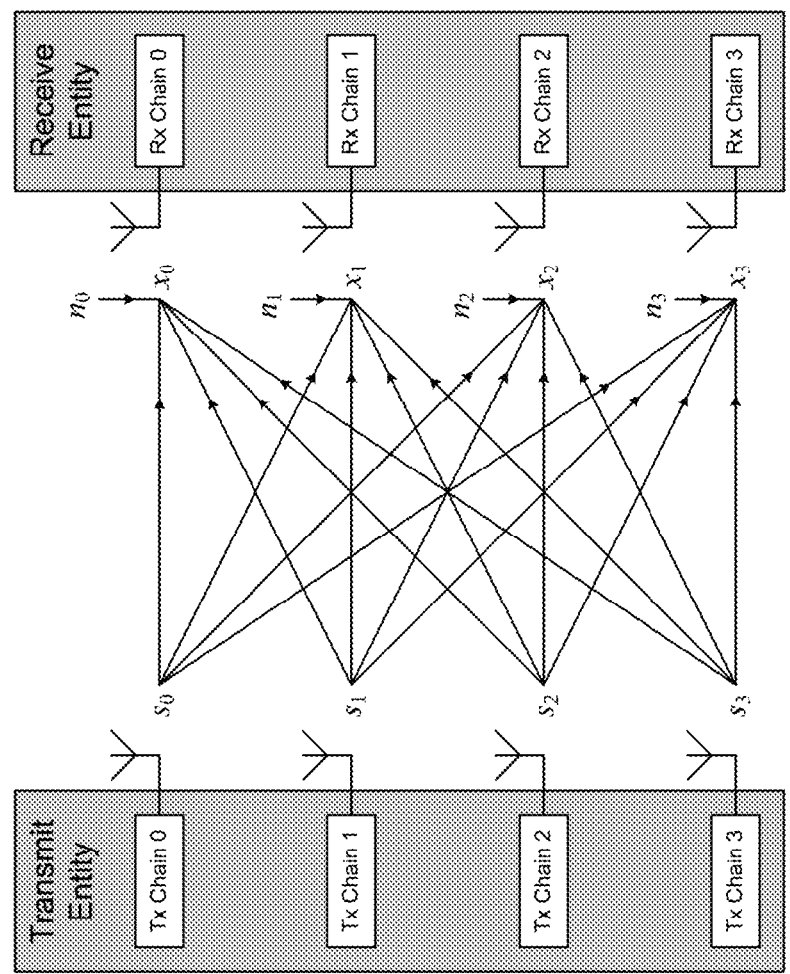
FIG. 7 illustrates an example of a SM-MIMO wireless communication system with four transmit chains at the transmit entity and four receive chains at the receive entity, which may be employed with aspects of the invention described herein.

Aspects of the present invention may be implemented in firmware of the MCU or the SPU of the baseband subsystem 16 shown in FIG. 3. In another alternative, aspects of the present invention may also be implemented as a combination of firmware and hardware of the baseband subsystem 16. By way of example, aspects of the present invention may be implemented in any communication entity in the wireless communication systems such as client terminal, the base station and others.

In accordance with such aspects of the present invention, the aforementioned processes may be applied to various wireless communication systems such as systems based on an IEEE 802.16 wireless communication standard, an IEEE 802.11 wireless communication standard, an IEEE 802.20 wireless communication standard, Wideband Code Division Multiple Access (WCDMA) wireless communication standard, a 3GPP wireless communication standard, or a Long Term Evolution (LTE), a 3GPP wireless communication standard.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of decoding spatially multiplexed signals received by a wireless device, the method comprising:
   receiving, using a plurality of receive chains, spatially multiplexed signals including a plurality of symbols from a transmitting device;
   deriving, using one or more processing devices, an estimated channel matrix H from the plurality of received symbols;
   decomposing, using the one or more processing devices, the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix;
   applying, using the one or more processing devices, a first M-algorithm process to a bottom set of $N_r/2$ rows of a system of equations $y^1=R^1s+w^1$ to obtain a first set of M candidates, wherein $N_r$ identifies a number of receive chains, $y^1$ is a first rotated received signal vector, s is a transmitted symbol vector and $w^1$ is a first rotated noise vector;

applying, using the one or more processing devices, a second M-algorithm process to a top set of $N_t/2$ rows of a system of equations $y^2=R^2s+w^2$ to obtain a second set of M candidates, wherein $y^2$ is a second rotated received signal vector and $w^2$ is a second rotated noise vector;

performing, using the one or more processing devices, a distance determination over M*M candidates by combining the first and second sets of M candidates from the top set and the bottom set, wherein M identifies a number of candidate neighbors; and obtaining, using the one or more processing devices, a candidate from among the M*M candidates having a global minimum distance to select a final decoded symbol vector identifying a given one of the plurality of received symbols.

2. The method of claim 1, wherein the first and second M-algorithm processes are done in parallel.

3. The method of claim 1, further comprising demodulating the received symbols of $y^1$ and $y^2$ without computing any distance metrics.

4. The method of claim 3, wherein the demodulation is performed by the one or more processing devices by quadrant based demodulation of the received symbols.

5. The method of claim 1, further comprising selecting a set of $N_b$ nearest neighbor symbol sequences, wherein the number of nearest neighbor symbol sequences is constrained to be less than a constellation size L of the received symbols and greater than or equal to M.

6. The method of claim 5, wherein, when $N_b$ is equal to M, completing any remaining M-algorithm processing.

7. The method of claim 5, wherein when $N_b$ is greater than M, the method further comprises:
 determining, by the one or more processing devices, distance metrics for the bottommost row of $y^1=R^1s+w^1$ over the $N_b$ candidates;
 selecting, from the determined distance metrics, the M candidates having the lowest distance for a next stage of M-algorithm processing; and
 completing any remaining M-algorithm processing.

8. A wireless receiver apparatus configured to decode spatially multiplexed signals, the apparatus comprising:
 a plurality of receive chains configured to receive spatially multiplexed signals including a plurality of symbols from a transmitting device; and
 one or more processing devices operatively coupled to the plurality of receive chains, the one or more processing devices being configured to:
 derive an estimated channel matrix H from the plurality of received symbols;
 decompose the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix;
 apply a first M-algorithm process to a bottom set of $N_t/2$ rows of a system of equations $y^1=R^1s+w^1$ to obtain a first set of M candidates, wherein $N_t$ identifies a number of receive chains, $y^1$ is a first rotated received signal vector, s is a transmitted symbol vector and $w^1$ is a first rotated noise vector;
 apply a second M-algorithm process to a top set of $N_t/2$ rows of a system of equations $y^2=R^2s+w^2$ to obtain a second set of M candidates, wherein $y^2$ is a second rotated received signal vector and $w^2$ is a second rotated noise vector;
 perform a distance determination over M*M candidates by combining the first and second sets of M candidates from the top set and the bottom set, wherein M identifies a number of candidate neighbors; and
 obtain a candidate from among the M*M candidates having a global minimum distance to select a final decoded symbol vector identifying a given one of the plurality of received symbols.

9. The apparatus of claim 8, wherein the first and second M-algorithm processes are performed in parallel by the one or more processing devices.

10. The apparatus of claim 8, wherein the one or more processing devices are further configured to demodulate the received symbols of $y^1$ and $y^2$ without computing any distance metrics.

11. The apparatus of claim 10, wherein the demodulation is performed by the one or more processing devices by quadrant based demodulation of the received symbols.

12. The apparatus of claim 8, wherein the one or more processing devices are further configured to select a set of $N_b$ nearest neighbor symbol sequences, wherein the number of nearest neighbor symbol sequences is constrained to be less than a constellation size L of the received symbols and greater than or equal to M.

13. The apparatus of claim 12, wherein, upon selection of $N_b$ to equal to M, the one or more processing devices are further configured to complete any remaining M-algorithm processing.

14. The apparatus of claim 12, wherein when $N_b$ is selected to be greater than M, the one or more processing devices are further configured to:
 determine distance metrics for the bottommost row of $y^1=R^1s+w^1$ over the $N_b$ candidates;
 select the M candidates having the lowest distance for a next stage of M-algorithm processing; and
 complete any remaining M-algorithm processing.

15. A non-transitory recording medium storing instructions thereon, the instructions, when executed by one or more processing devices, cause the one or more processing devices to execute a method of decoding spatially multiplexed signals received by a wireless device, the method comprising:
 receiving, using a plurality of receive chains, spatially multiplexed signals including a plurality of symbols from a transmitting device;
 deriving, using one or more processing devices, an estimated channel matrix H from the plurality of received symbols;
 decomposing, using the one or more processing devices, the estimated channel matrix H into first and second unitary matrices $Q^1$ and $Q^2$, and first and second triangular matrices $R^1$ and $R^2$, wherein $R^1$ is an upper right triangular matrix and $R^2$ is a lower left triangular matrix;
 applying, using the one or more processing devices, a first M-algorithm process to a bottom set of $N_t/2$ rows of a system of equations $y^1=R^1s+w^1$ to obtain a first set of M candidates, wherein $N_t$ identifies a number of receive chains, $y^1$ is a first rotated received signal vector, s is a transmitted symbol vector and $w^1$ is a first rotated noise vector;
 applying, using the one or more processing devices, a second M-algorithm process to a top set of $N_t/2$ rows of a system of equations $y^2=R^2s+w^2$ to obtain a second set of M candidates, wherein $y^2$ is a second rotated received signal vector and $w^2$ is a second rotated noise vector;

performing, using the one or more processing devices, a distance determination over M*M candidates by combining the first and second sets of M candidates from the top set and the bottom set, wherein M identifies a number of candidate neighbors; and obtaining, using the one or more processing devices, a candidate from among the M*M candidates having a global minimum distance to select a final decoded symbol vector identifying a given one of the plurality of received symbols.

16. The non-transitory recording medium of claim 15, wherein the method further comprises demodulating the received symbols of $y^1$ and $y^2$ without computing any distance metrics.

17. The non-transitory recording medium of claim 16, wherein the demodulation is performed by the one or more processing devices by quadrant based demodulation of the received symbols.

18. The non-transitory recording medium of claim 15, wherein the method further comprises selecting a set of $N_b$ nearest neighbor symbol sequences, wherein the number of nearest neighbor symbol sequences is constrained to be less than a constellation size L of the received symbols and greater than or equal to M.

19. The non-transitory recording medium of claim 18, wherein, when $N_b$ is equal to M, the method further comprises completing any remaining M-algorithm processing.

20. The non-transitory recording medium of claim 18, wherein when $N_b$ is greater than M, the method further comprises:

determining, by the one or more processing devices, distance metrics for the bottommost row of $y^1=R^1s+w^1$ over the $N_b$ candidates;

selecting, from the determined distance metrics, the M candidates having the lowest distance for a next stage of M-algorithm processing; and completing any remaining M-algorithm processing.

* * * * *